(12) United States Patent
Parker

(10) Patent No.: US 9,264,048 B2
(45) Date of Patent: Feb. 16, 2016

(54) SECRET OPERATIONS USING RECONFIGURABLE LOGICS

(71) Applicant: Rachael J. Parker, Forest Grove, OR (US)

(72) Inventor: Rachael J. Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 14/132,182

(22) Filed: Dec. 18, 2013

(65) Prior Publication Data

US 2015/0171870 A1 Jun. 18, 2015

(51) Int. Cl.
*H03K 19/177* (2006.01)
*H04L 9/08* (2006.01)

(52) U.S. Cl.
CPC ........ *H03K 19/17768* (2013.01); *H04L 9/0869* (2013.01)

(58) Field of Classification Search
CPC .................. H04L 9/0869; H03K 19/17768
USPC .......................................................... 380/44
See application file for complete search history.

(56) References Cited

U.S. PATENT DOCUMENTS

| 4,546,468 | A | * | 10/1985 | Christmas et al. | 370/376 |
| 5,239,581 | A | * | 8/1993 | Hane | 380/260 |
| 7,813,507 | B2 | * | 10/2010 | Brickell et al. | 380/268 |
| 8,656,175 | B2 | * | 2/2014 | Haga et al. | 713/176 |
| 2011/0154278 | A1 | * | 6/2011 | Caldwell et al. | 716/103 |
| 2014/0266297 | A1 | * | 9/2014 | Mathew et al. | 326/9 |

* cited by examiner

*Primary Examiner* — Teshome Hailu
*Assistant Examiner* — Aubrey Wyszynski
(74) *Attorney, Agent, or Firm* — Lowenstein Sandler LLP

(57) ABSTRACT

An integrated circuit includes a programmable logic device and optionally a control circuit coupled to the programmable logic device (PLD). The control circuit may detect that a reconfiguration criterion is satisfied. Responsive to the reconfiguration criterion being satisfied, the control logic may configure, using one or more randomizations, the PLD to implement a secret operation, wherein a first randomized configuration of the PLD results in a first circuit implementation that is different from, but functionally equivalent to, a second circuit implementation that results from a second randomized configuration of the PLD.

20 Claims, 9 Drawing Sheets

SECRET OPERATIONS USING RECONFIGURABLE LOGICS

TECHNICAL FIELD

Embodiments described herein generally relate to securing data in a computing device and, more specifically, relate to hardware that is resistant to attacks.

BACKGROUND

Integrated circuits such as microprocessors (e.g., central processing units (CPUs)) and systems on a chip (SOCs) often contain cryptography circuits and/or other circuits that process secret information. Malicious attacks against such cryptographic circuits and/or other circuits are commonplace. Examples of common hardware attacks that are performed include physical and laser voltage probing, infrared ray emission (IREM), focused ion beam edits (FIB), and laser assisted device alteration (LADA).

Circuit design solutions may exist against physical attacks on hardware that stores secret values (e.g., keys that are stored in the integrated circuits.) However, in conventional integrated circuits these secret values may become vulnerable when they are in use (e.g., when a secret value is in a register and operated on by digital logic).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
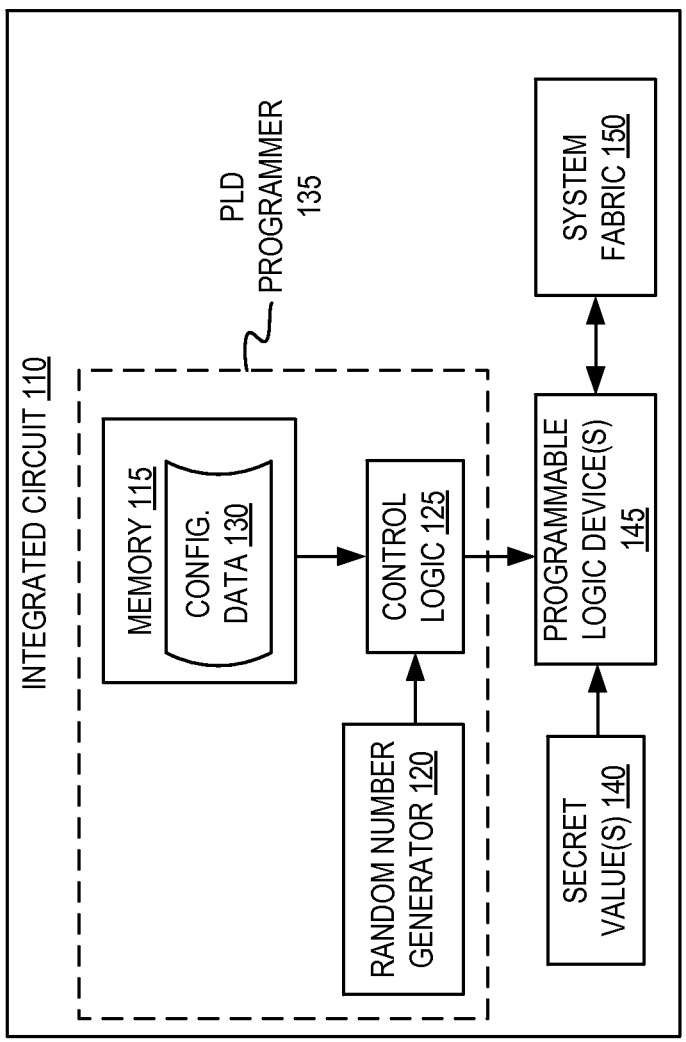
FIG. 1 is a block diagram of an integrated circuit system architecture, according to one embodiment of the disclosure.

Integrated circuits, such a microprocessors and systems on a chip (SoCs) frequently use secret values or keys to perform secret operations (e.g., security operations) such as encrypting data, decrypting data, validating the integrated circuit for use of data, and so on. Such integrated circuits may include a security circuit that uses such secret values to perform the security operations. The security circuit is a point of attack by entities that wish to determine the secret values. Conventional security circuits are often vulnerable to hardware attacks such as physical and laser voltage probing, infrared ray emission (IREM), focused ion beam edits (FIB), and laser assisted device alteration (LADA). These security circuits are also often vulnerable to side channel attacks such as differential power analysis (DPA), or electromagnetic attacks.

In one embodiment, an integrated circuit includes a programmable logic device (PLD) that is configured to perform a secret operation. The PLD may have more degrees of freedom than are used to perform the secret operation. This enables the PLD to be configured in numerous different ways, and yet still perform the same secret operation. Thus, embodiments introduce spatial randomization into circuits that perform secret operations. For example, the PLDs of different parts may be configured to change the locations of gates performing security logic from one part to the next. Alternatively or additionally, a PLD of a single part may be reconfigured to change the locations of gates from one cycle to the next.

In one embodiment, to take advantage of the multiple different configurations that can be used for a particular secret operation, the integrated circuit contains a control logic that reconfigures the PLD responsive to detecting a reconfiguration criterion. For example, the control logic may reconfigure the PLD each time the integrated circuit is powered on, each time the secret operation is to be performed by the PLD, periodically, and so on. The control logic may be coupled to a memory that stores configuration data (e.g., one or more configuration files) that can be used to generate many different randomized configurations, each of which will perform the same functional secret operation. Each randomized configuration may be used to configure the PLD into a distinct physical circuit that is different from, but functionally equivalent to, physical circuits that result from other randomized configurations of the PLD. This presents a spatially moving target for an attacker. Traditional debug and failure analysis tools may be used to attack security logic after specific preparation and precise positioning of probes along with time averaged data collection. However, attacks using these tools may be thwarted when the logic circuit itself moves over time. Thus, with each reconfiguration of the PLD by the control logic, the locations of bits of the secret values in the PLD changes. Accordingly, hardware attacks such as IREM, FIB, LADA, and so on become statistically infeasible. Embodiments can also mitigate side channel attacks (e.g., DPA) if the reconfiguration of the control logic alters the power consumption or electromagnetic radiation correlation with the secret values.

In another embodiment, a discrete PLD programmer may contain the control logic and the memory storing the configuration file or files. The discrete PLD programmer may include an integrated circuit (IC) receiving area that can receive an IC. Once the IC is received (e.g., inserted into the IC receiving area), the PLD programmer may generate a randomized configuration and then program or configure the PLD with the randomized configuration. Alternatively, the PLD programmer may program the PLD before the IC is packaged (e.g., at the silicon (wafer) level test or probe stages of manufacturing). In such embodiments, different ICs would have different randomized configurations. Thus, if an attacker is able to eventually successfully hack into a first IC, that success will not help the attacker in gaining access to other ICs of the same manufacture.

FIG. 1 is a block diagram of an integrated circuit 110, according to one embodiment of the disclosure. The integrated circuit 110 may be an integrated circuit having a processing capability. Examples of integrated circuits include a processing device (e.g., a complex instruction set computing (CISC) microprocessor, reduced instruction set computer (RISC) microprocessor, very long instruction word (VLIW) microprocessor, digital signal processor (DPS), processor implementing other instruction sets, or processors implementing a combination of instruction sets), a system on a chip (SOC), an application specific integrated circuit (ASIC), or the like.

The integrated circuit 110 may include multiple different components that are not illustrated in FIG. 1 so as not to occlude embodiments of the invention. For example, the integrated circuit 110 may be a processing device that includes one or more cores, an uncore logic, a memory controller, various levels of cache, and so on. The uncore logic may include logic for, among other things, maintaining, reading from, and writing to a main memory. The uncore logic may include one or more of a home agent, an integrated memory controller, a power unit, and/or other processing units. The integrated circuit 110 may additionally be, for example, an SoC that includes one or more processing devices, various memories, a display unit, and/or other components that are not shown.

The various non-illustrated components of the integrated circuit 110 may connect to a programmable logic device (PLD) 145 of the integrated circuit 110 via a system fabric 150. The system fabric 150 may also connect the PLD 145 to other integrated circuits, which may be communicatively coupled to the integrated circuit 110 via a bus. The system fabric 150 is one or more interconnects of the integrated circuit that ties the individual components of the integrated circuit 110 together. The system fabric 150 may include buses, crossbars, bridges, network interface units and/or other logic for transporting information between components of the integrated circuit and/or to other integrated circuits.

The programmable logic device 145 is an electronic component used to build reconfigurable circuits. The PLD 145 is a combination of a logic device and a memory device. The memory portion of the PLD 145 stores a pattern (configuration) that was programmed into the PLD 145, and the logic portion performs a function based on the pattern programmed into the PLD 145. The PLD 145 may have an undefined function at the time of manufacture. The PLD 145 can be configured (also referred to as being programmed) to cause it to perform a particular function. In one embodiment, the PLD 145 is a programmable gate array (PGA) such as a field programmable gate array (FPGA). In other embodiments, the PLD 145 may be a programmable logic array (PLA), programmable array logic (PAL), generic array logic (GAL), complex programmable logic device (CPLD), or a reconfigurable system.

The PLD 145 may be configured to perform a secret operation such as a security operation. In one embodiment, the secret operation is performed using one or more secret values 140 as an input. Some example secret operations include cryptographic functions such as a cryptographic hash function (e.g., to verify the integrity of files or messages, perform password verification, identify data, derive a key, etc.), an encryption function (e.g., to encrypt or decrypt data), a secure storage function (e.g., of the secret value(s) 140), and so on. For example, the PLD 145 may be configured as a block cipher or stream cipher. Example block ciphers may encrypt and decrypt data using the data encryption standard (DES), international data encryption algorithm (IDEA), RC5, advanced encryption standard (AES), Blowfish, or other encryption algorithms. The PLD 145 may be configured to use a block cipher in a mode of operation, such as the electronic codebook (ECB) mode of operation, cipher-block chaining (CBC) mode of operation, propagation cipher-block chaining (PCBC) mode of operation, cipher feedback (CFB) mode of operation, output feedback (OFB) mode of operation, counter (CTR) mode of operation, and so forth.

Secret values 140 are secure values that are used for various purposes by the integrated circuit 110. The secret values 140 may be used as initialization vectors, as keys, or for other purposes. For example, a secret value 140 may be a key that can be used to authenticate the integrated circuit. Secret values 140 may be securely stored in integrated circuit 110. In one embodiment, secret values 140 are the output of physical unclonable function (PUF) circuits. Such a PUF circuit may implement a challenge-response authentication in which responsive to a stimulus being applied to the PUF circuit, the PUF circuit responds with a value that is unpredictable but repeatable due to a complex interaction of the stimulus with a physical microstructure of the PUF circuit. In another embodiment, the secret value or values 140 are stored in fuses or other one time programmable (OTP) memory. Alternatively, other forms of secure storage may be used.

Integrated circuit 110 further includes a control logic 125, memory 115 and random number generator 120, which are collectively referred to as a PLD programmer 135. The memory may be non-volatile memory such as a read only memory (ROM), a Flash memory, an erasable programmable read only memory (EPROM), an electrically erasable read only memory (EEPROM), a one time programmable (OTP) memory, or other media suitable for non-volatile storage of electronic instructions. The memory may store one or multiple configuration files 130 for implementing a secret operation. In some embodiments, tens to hundreds of different configuration files 130 may be stored. Alternatively, one or a few configuration files 130 may be stored.

The random number generator (RNG) 120 may be a hardware true random number generator or a hardware pseudorandom number generator. The RNG 120 may rely on physical methods or computational methods to generate random (or cryptographically secure pseudorandom) values. One example of a pseudorandom number generator is a linear feedback shift register (LFSR). In one embodiment, a value that is unique to the IC 110 (e.g., output by a PUF circuit) is used rather than a random number generator 120 to influence the generation of a randomized configuration for implementing a secret operation.

The control logic 125 is coupled to the PLD 145 and is capable of periodically reconfiguring the PLD 145 by programming a new randomized configuration of a secret operation into the PLD. The PLD 145 has more degrees of freedom than are used by the secret operation, enabling there to be multiple different configurations of the PLD 145 that can accomplish the same secret operations. In some embodiments, there may be hundreds, thousands, millions, or more unique configurations of the PLD 145, each of which may perform the same secret operation. By ensuring that the PLD 145 has more degrees of freedom than will be used (e.g., more gates than will be used), it can be assured that a large enough number of circuit permutations can be implemented such that time averaging of a specific probed signal will not provide useful information. Additionally, unused gates or other resources can be used to perform superfluous functions or operations for the purpose of further obfuscation. In addition, attempts to read the state of the system using IREM or other techniques will be impaired by the inability of an attacker to determine the exact configuration of the logic. Side channel attacks such as differential power analysis may also be hindered if different circuit permutations are designed to have different power supply noise characteristics during operation.

To reconfigure the PLD 145, the control logic 125 retrieves configuration data (e.g., a configuration file) 130 from memory 115. The configuration data 130 contains instructions for programming a pattern into the PLD 145 (e.g., for configuring the PLD 145). The retrieved configuration data 130 may have a fixed configuration or may have one or more randomization components that can cause one or more randomizations when the PLD 145 is configured using the configuration data 130.

In one embodiment, the configuration data 130 contains one or more randomization components. Each randomization component may cause the configuration that is to be applied to the PLD 145 to vary based on one or more random values provided by the random number generator 120. For example, a randomization component may control which gate of the PLD 145 is to hold or process a particular bit during a secret operation. The particular gate that is used for a particular randomized configuration may vary based on a random value from the random number generator. The randomization components or fields of the configuration data 130 cause the final randomized configuration that is generated to be unpredictable.

The configuration data may take many different forms, some of which are described herein. In one embodiment, the configuration data 130 is a binary file. Alternatively, the configuration data 130 may be a netlist. A netlist may include descriptions of parts or devices used to configure the PLD into a physical circuit that can perform the secret operation, and an identification of one or more instances of these devices. Each device may have a definition that includes a list of connections that can be made to that device. Each instance of a device in the netlist may have one or more ports. Nets in the netlist are wires that connect together different devices or parts. In one embodiment, one or more of the devices, the nets and/or the instances include randomization components. These randomization components may affect how devices are configured, how devices are connected, routing between devices, gates used for particular bits of data, and so on. One example of a randomization component is a variable that is populated with a value from the RNG 120. The netlist may include one or many such randomization components. Control logic 125 may perform a place-and-route operation to generate a binary output that includes a randomized map or randomized configuration. The randomized configuration may then be used to program the PLD 145.

In one embodiment, the configuration data 130 is a hardware description language (HDL) or schematic design. Notable examples of HDL standards are Verilog and very-high-speed integrated circuits HDL (VHDL). Control logic 125 may include an electronic design automation tool that may generate a netlist from the HDL or schematic. The HDL or schematic may include one or more randomization components. These randomization components may be populated with values from the RNG 120 to cause the control logic 125 to generate a randomized netlist. This randomized netlist may then be used to generate a binary, which may then be used to program the PLD 145.

As mentioned, memory 115 may include multiple different configuration files or other different configuration data 130. In one embodiment, randomization is introduced by randomly (or pseudorandomly) selecting one of these configuration files to use for the configuration of the PLD 145. Different configuration files may have been independently created by different developers, and may be distinct from one another. For examine, different configuration files may be completely different in terms of circuit design. In one embodiment, each of the configuration files is associated with a unique identifier, and one or more values output from the RNG 120 are used to select a configuration file associated with a particular identifier.

In some embodiments the integrated circuit 110 includes multiple different PLDs 145. Any of these PLDs 145 may be configured to perform the secret operation. In one embodiment, when a PLD 145 is to be configured, control logic 125 randomly selects one of the PLDs 145 to configure based on one or more values provided by the RNG 120. This PLD 145 may then be assigned to perform the secret operation until a PLD (the same PLD or a different PLD) is later configured to perform the secret operation in the future.

The control logic 125 may determine when to reconfigure the PLD 145 based on one or more configuration criteria or rules. Such configuration criteria may be stored in or accessible to the control logic 125. Control logic 125 may monitor the integrated circuit 110 for satisfaction of one or more of the configuration criteria. Once control logic 125 determines that a configuration criterion has been satisfied, control logic 125 reconfigures the PLD 145.

Examples of configuration criteria are provided. However, many other configuration criteria are also possible. One configuration criterion may cause the control logic 125 to generate a new configuration for the PLD 145 each time the integrated circuit 110 is activated. For example, control logic 125 may configure the PLD 145 as part of an initialization process. Another configuration criterion may be based on a time period. Control logic may set a timer after the PLD 145 is configured, and may reconfigure the PLD 145 when the timer times out. The timer may have any time period, examples of which include 10 seconds, 30 seconds, 1 minute, 5 minutes, 10 minutes, 30 minutes, 1 hour, and so on. Another configuration criterion may cause the control logic 125 to reconfigure the PLD 145 each time the secret operation is to be performed by the PLD 145. Accordingly, control logic 125 may monitor for a command to perform the secret operation, and responsive to detecting such a command may reconfigure the PLD 145. Other configuration criteria are also possible.

Once the PLD 145 has been configured, it becomes a circuit implementation (e.g., which in some instances may be considered to be a distinct physical circuit) with a specific routing, gates, inputs, outputs, and so forth. Each time the PLD 145 is reconfigured, it becomes a new circuit implementation, which may have different routing, gates, inputs, etc. and/or a different spatial arrangement of the routing, gates, inputs, etc. from one or more previous circuit implementations. Different circuit implementations may additionally perform different superfluous operations that provide an additional layer of obfuscation. However, each of these circuit implementations perform the same secret operation. For example, if the secret operation is an AES encryption engine, then each of the circuit implementations will be different implementations of the same AES encryption engine. Thus, regardless of the randomized configuration that is used to program the PLD 145 into a particular circuit implementation, that circuit implementation will take the same initial inputs and produce the same final outputs as any of the other circuit implementations generated from other randomized configurations. This introduces a dynamic spatial randomization into the circuits that perform the secret operations, which may render many hardware attacks and/or side channel attacks infeasible.

Figure 2:
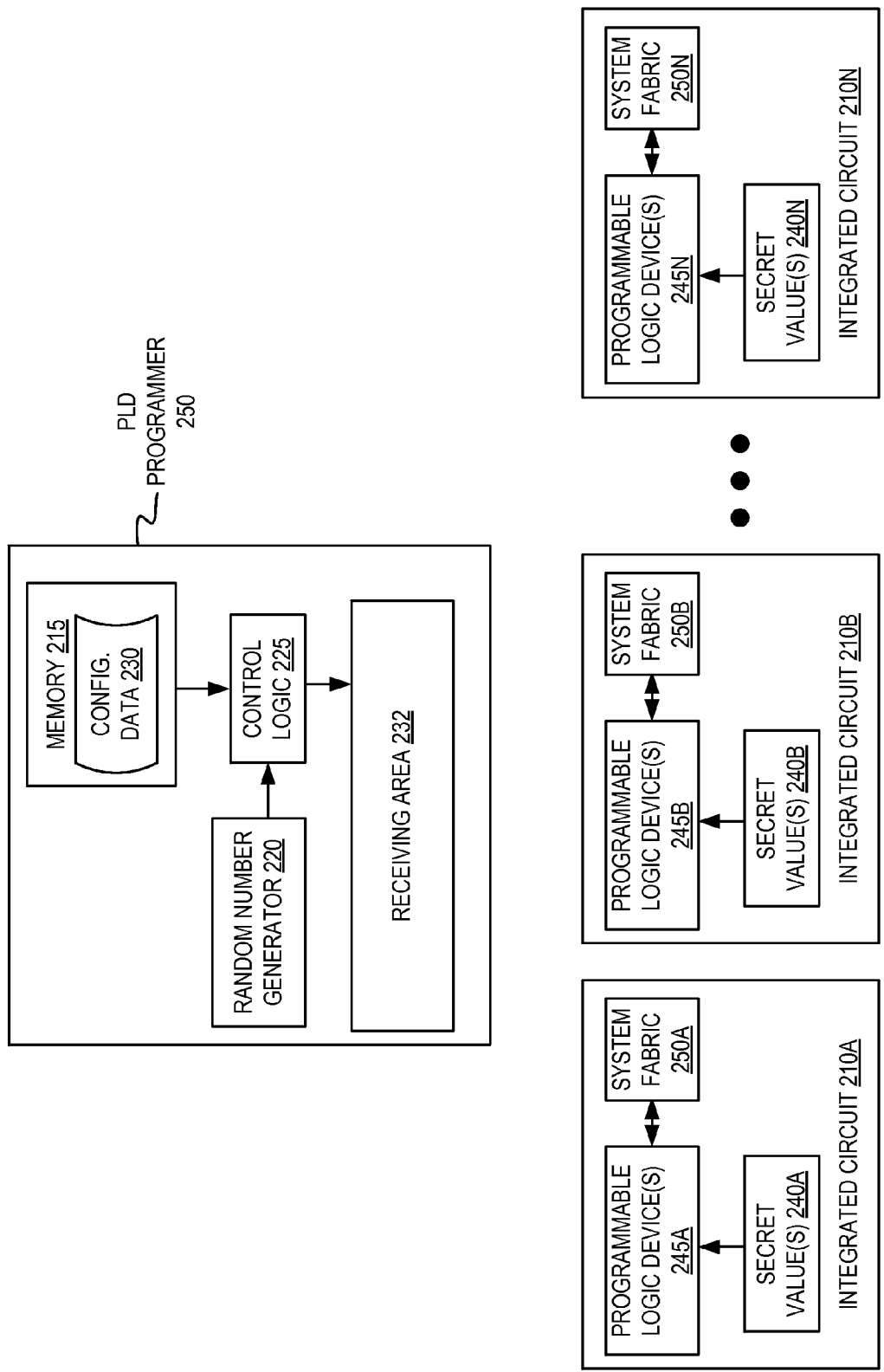
FIG. 2 is a block diagram of a programmable logic device programmer and integrated circuits having programmable logic devices to be programmed, according to an embodiment of the disclosure.

FIG. 2 is a block diagram of a programmable logic device programmer 250 and integrated circuits (ICs) 210A-210N having programmable logic devices 245A-245N to be programmed, according to an embodiment of the disclosure. The integrated circuits 210A-210N may each be different instances of the same IC design. In one embodiment, the integrated circuits 210A-210N have components that match those of IC 110 of FIG. 1, except for the exclusion of PLD programmer 135.

The ICs 210A-210N may each be processing devices, SoCs, ASICs, or other devices that include a PLD 245A-245N and a system fabric 250A-250N. The PLDs 245A-245N may each have more degrees of freedom than will be used to perform a particular secret operation. Thus, multiple different configurations of the PLDs 245A-245N may be possible, each of which may be functionally equivalent.

The ICs 210A-210N may additionally include one or more secret values 240A-240N. The secret values 240A-240N may be provided by PUF circuits, stored in fuses or stored in other one time programmable (OTP) memory in various embodiments. Alternatively, the secret values 240A-240N may be programmed into the PLDs 245A-245N. For example, the PLDs 245A-245N could include gates with inputs tied to supplies such that they repeatedly (e.g., always) produce the same secret values 240A-240N.

Without a PLD programmer, the ICs 210A-210N do not dynamically reconfigure the PLDs 245A-245N in the field. However, a discrete PLD programmer 250 may be used to program the PLDs 245A-245N such that each of these PLDs 245A-245N has a different randomized configuration.

The PLD programmer 250 may include a memory 215, RNG 220 and control logic 225, which may correspond to like named components of FIG. 1. The memory 215 and RNG 220 may correspond to memory 115 and RNG 120 of FIG. 1 in one embodiment. In one embodiment, RNG 220 is a hardware RNG 220. Alternatively, RNG 220 may be a software true random number generator or a software pseudorandom number generator.

PLD programmer 250 may additionally include a receiving area 232 that can receive an IC 210A-210N. The receiving area 232 may be, for example, a port or socket into which the ICs 210A-210N are inserted. The receiving area 232 may have a different form if the PLDs are programmed before the ICs are packaged (e.g., at the silicon level test or probe stages of manufacturing). In one embodiment, PLD programmer 250 includes multiple receiving areas, and can program the PLDs of multiple integrated circuits in parallel. While an integrated circuit 210A-210N is connected to (e.g., inserted into) the receiving area 232, the control logic 225 may generate a randomized configuration of a circuit for performing a secret operation, and may configure the PLD 245A-245N of the IC 210A-210N into that circuit.

Control logic 225 may use one or more random values from RNG 220 to select configuration data 230 to use for generating a randomized configuration. Additionally or alternatively, control logic 225 may introduce one or more randomizations into randomization components of selected configuration data based on values from RNG 220. If an IC 210A-210N includes multiple PLDs 245A-245N, control logic may also use a provided random value to select which of the PLDs 245A-245N to select to implement a secret operation.

In some embodiments, as shown, the PLD programmer 250 is a discrete device. Alternatively, the PLD programmer 250 may be implemented in software and/or firmware that runs on test and/or probe equipment and/or on a computing device that interfaces with test and/or probe equipment. Thus, the PLD programmer 250 may leverage existing test and configuration interfaces of the ICs 210A-201N to program the PLDs 245A-245N. For example, the PLD programmer 250 may program the PLDs 245A-245N during probing (e.g., as test patterns are run during wafer probing) or during IC test and configuration after packaging. In such an instance, the configuration data 230, control logic 225 and/or random number generator 220 may be software modules rather than hardware modules.

Figure 3:
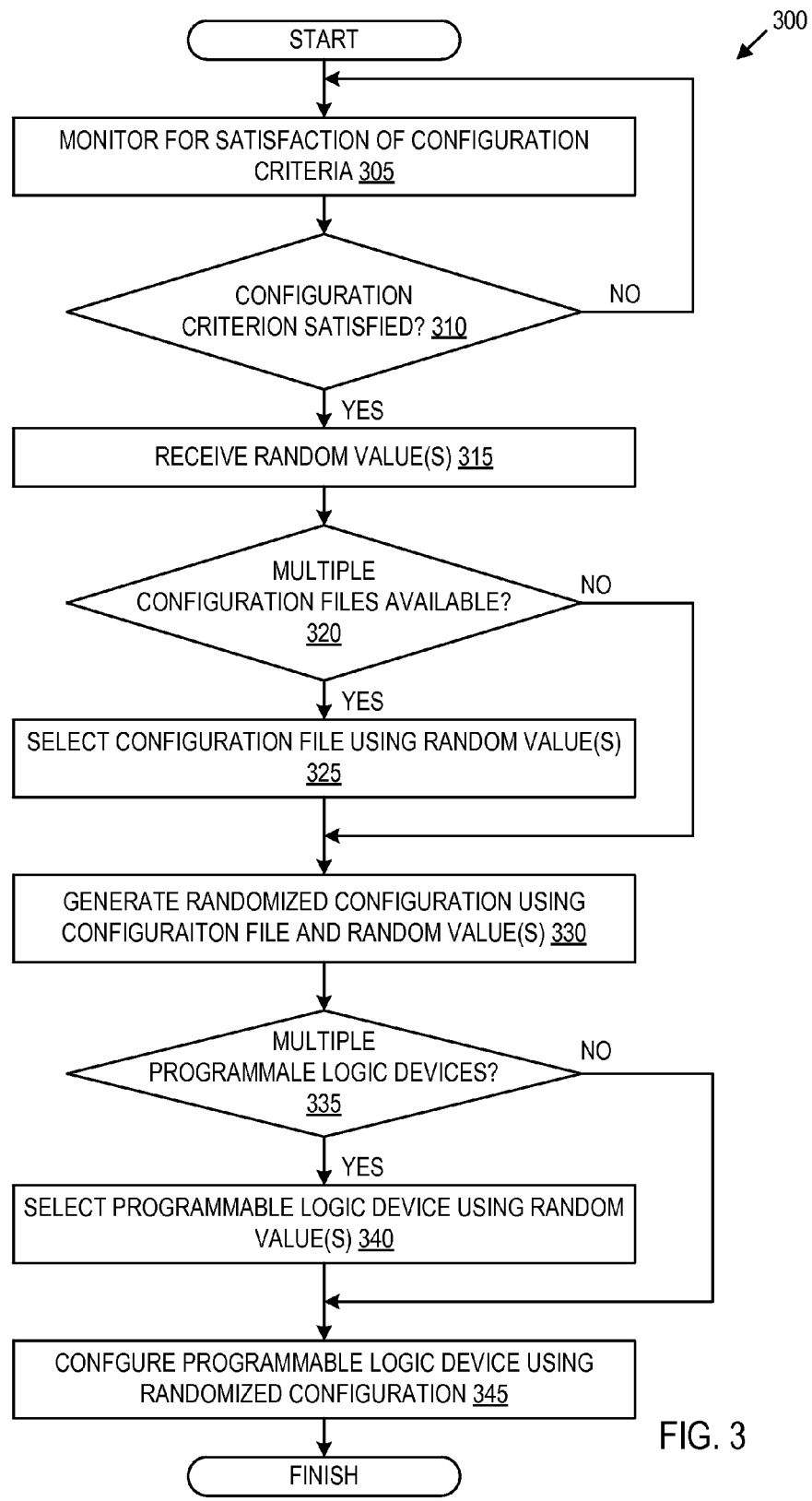
FIG. 3 is a flow diagram illustrating a method of configuring programmable logic devices to implement a secret operation, according to one embodiment of the disclosure.

FIG. 3 is a flow diagram illustrating a method 300 of configuring programmable logic devices to implement a secret operation, according to one embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed by PLD programmer 135 of FIG. 1. Alternatively, method 300 may be performed by PLD programmer 250 of FIG. 2.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

At block 305 of method 300, processing logic monitors for satisfaction of one or more configuration criteria. If processing logic is part of a discrete PLD programmer, then the configuration criterion may be detection of a new IC. If processing logic is part of an IC that includes a PLD to be configured, then the configuration criterion may be expiration of a time period, detection of a request to perform a secret operation, a powering on of the IC, and so forth. At block 310, processing logic determines if any configuration criteria are satisfied. If a configuration criterion is satisfied, the method proceeds to block 315. Otherwise the method returns to block 305.

At block 315, processing logic receives one or more random values. The random values may be received from a hardware or software true random number generator or a hardware or software pseudorandom number generator.

At block 320, processing logic determines if multiple configuration files or other configuration data are available. If multiple configuration files are available, processing logic selects one of the available configuration files using one or more of the received random values at block 325. Otherwise, the method proceeds to block 330.

At block 330, processing logic generates a randomized configuration using the selected configuration file and one or more of the random values. The selected configuration file may include one or more randomization components, and the random values may be inserted at these randomization components to introduce the randomization. Alternatively, the operations of block 330 may be skipped. For example, processing logic may have access to multiple pre-generated configuration files, none of which have randomization components. In such an embodiment, randomization may be introduced simply by randomly selecting one of the available configuration files (at block 325).

At block 335, processing logic determines whether there are multiple different PLDs that are available to be programmed. If multiple PLDs are available, the method continues to block 340 at which processing logic uses one or more of the random values to randomly select one of the PLDs. Otherwise, the method proceeds to block 345.

At block 345, processing logic configures the selected (or only) PLD using the generated or selected randomized configuration. The method may then end in some embodiments. Alternatively, in some embodiments the method may return to block 305, at which processing logic may continue to monitor for satisfaction of one or more of the configuration criteria.

Figure 4:
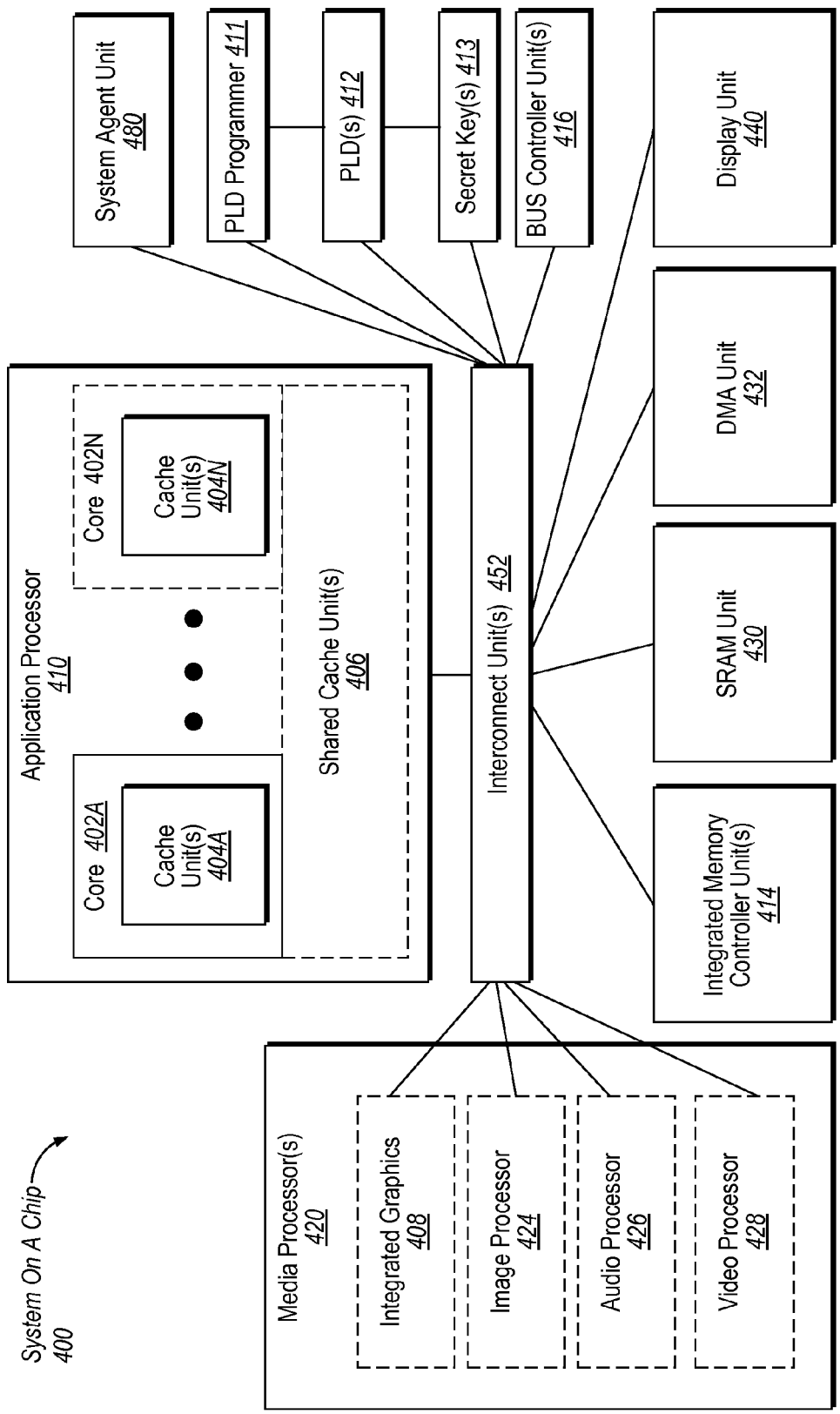
FIG. 4 is a block diagram of a system on chip (SoC), in accordance with an embodiment of the present disclosure.

FIG. 4 is a block diagram of a SoC 400 in accordance with an embodiment of the present disclosure. Dashed lined boxes are optional features on more advanced SoCs. In FIG. 4, an interconnect unit(s) 452 is coupled to: an application processor 410 which includes a set of one or more cores 402A-N and shared cache unit(s) 406; a system agent unit 480; a bus controller unit(s) 416; an integrated memory controller unit(s) 414; a set of one or more media processors 420 which may include integrated graphics logic 408, an image processor 424 for providing still and/or video camera functionality, an audio processor 426 for providing hardware audio acceleration, and a video processor 428 for providing video encode/decode acceleration; an static random access memory (SRAM) unit 430; a direct memory access (DMA) unit 432; and a display unit 440 for coupling to one or more external displays. In one embodiment, one or more PLDs 412 and/or secret keys 413 (as discussed in conjunction with FIGS. 1-3) may be included in the SoC 400. In one embodiment, a PLD programmer 411, PLD 412 and secret key 413 are included in the SoC.

The memory hierarchy may include one or more levels of cache 404A-404N within the cores 402A-402N, a set or one or more shared cache units 406, and external memory (not shown) coupled to the set of integrated memory controller units 414. The set of shared cache units 406 may include one or more mid-level caches, such as level 2 (L2), level 3 (L3), level 4 (L4), or other levels of cache, a last level cache (LLC), and/or combinations thereof.

In some embodiments, one or more of the cores 402A-N are capable of multithreading.

The system agent 480 includes those components coordinating and operating cores 402A-N. The system agent unit 480 may include for example a power control unit (PCU) and a display unit. The PCU may be or include logic and components needed for regulating the power state of the cores 402A-N and the integrated graphics logic 408. The display unit is for driving one or more externally connected displays.

The cores 402A-N may be homogenous or heterogeneous in terms of architecture and/or instruction set. For example, some of the cores 402A-N may be in order while others are out-of-order. As another example, two or more of the cores 402A-N may be capable of execution of the same instruction set, while others may be capable of executing only a subset of that instruction set or a different instruction set.

The application processor 410 may be a general-purpose processor, such as a Core™ i3, i5, i7, 2 Duo and Quad, Xeon™, Xeon-Phi™, Itanium™, XScale™ or StrongARM™ processor, which are available from Intel Corporation, of Santa Clara, Calif. Alternatively, the application processor 410 may be from another company, such as ARM Holdings, Ltd, MIPS, etc. The application processor 410 may be a special-purpose processor, such as, for example, a network or communication processor, compression engine, graphics processor, co-processor, embedded processor, or the like. The application processor 410 may be implemented on one or more chips. The application processor 410 may be a part of and/or may be implemented on one or more substrates using any of a number of process technologies, such as, for example, NMOS, BiCMOS, CMOS, or future process technologies that may supplement or replace these.

Figure 5:
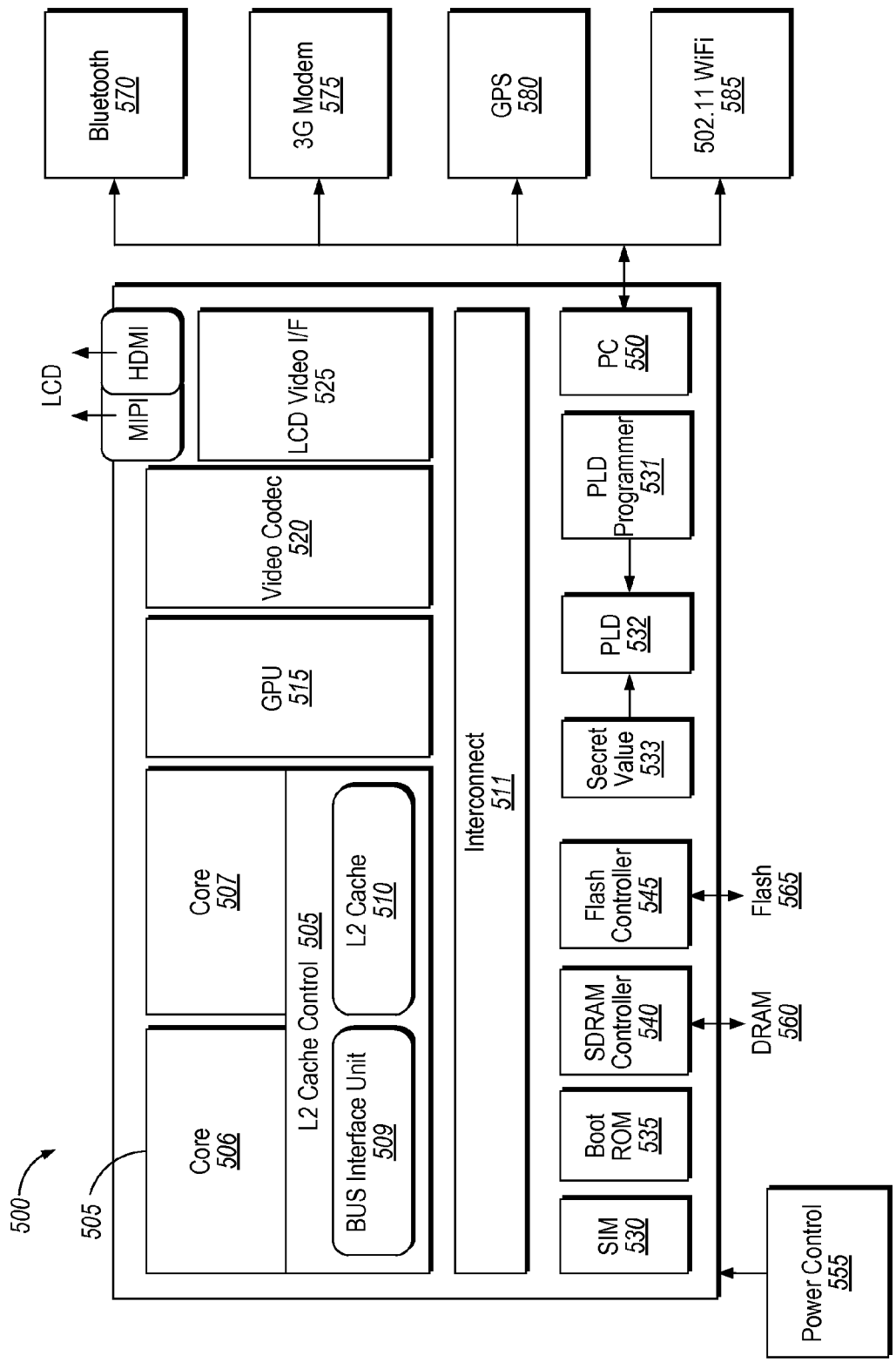
FIG. 5 is a block diagram of an embodiment of a system on-chip (SOC) design, in accordance with another embodiment of the present disclosure.

FIG. 5 is a block diagram of an embodiment of a system on-chip (SOC) design in accordance with embodiments of the present disclosure. As a specific illustrative example, SOC 500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, a secret value 533, PLD 532 and/or PLD programmer 531 (as discussed in conjunction with FIGS. 1-3) may be included in the one or more of the cores 506 and 507. In another embodiment, the secret value 533, PLD 532 and/or PLD programmer 531 may be included in one or more other components of the SOC.

Here, SOC 500 includes 2 cores—506 and 507. Cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 505 that is associated with bus interface unit 509 and L2 cache 510 to communicate with other parts of system 500. Interconnect 510 includes an on-chip interconnect, such as an IOSF, AMBA, or other interconnect discussed above, which potentially implements one or more aspects of the described disclosure.

Interconnect 511 provides communication channels to the other components, such as a Subscriber Identity Module (SIM) 530 to interface with a SIM card, a boot ROM 535 to hold boot code for execution by cores 506 and 507 to initialize and boot SOC 500, a SDRAM controller 540 to interface with external memory (e.g. DRAM 560), a flash controller 545 to interface with non-volatile memory (e.g. Flash 565), a peripheral control 550 (e.g. Serial Peripheral Interface) to interface with peripherals, video codecs 520 and Video interface 525 to display and receive input (e.g. touch enabled input), GPU 515 to perform graphics related computations, etc. Any of these interfaces may incorporate aspects of the disclosure described herein.

In addition, the system 500 illustrates peripherals for communication, such as a Bluetooth module 570, 3G modem 575, GPS 580, and Wi-Fi 585. Note as stated above, a UE includes a radio for communication. As a result, these peripheral communication modules are not all required. However, in a UE, some form a radio for external communication is to be included.

Figure 6:
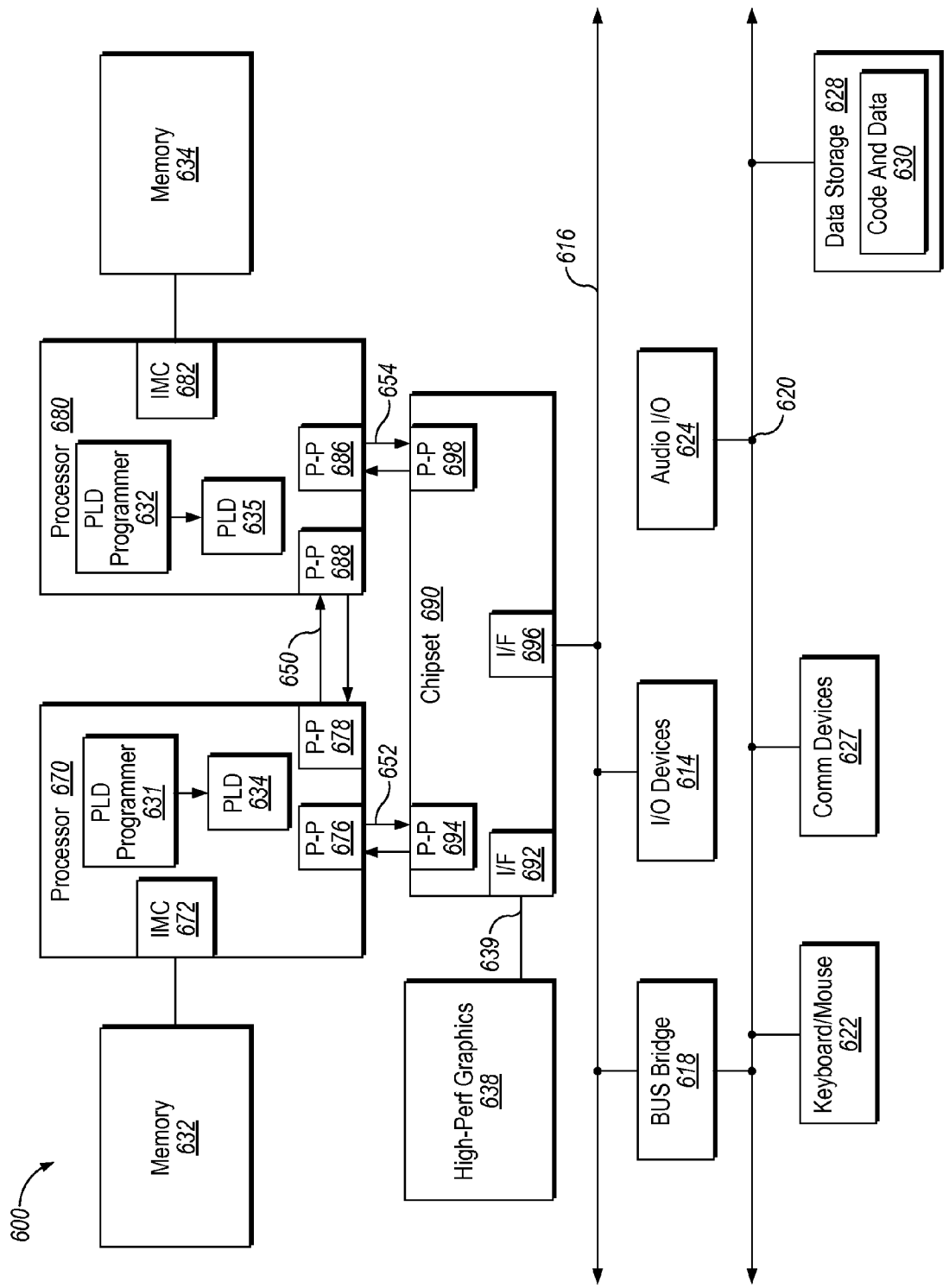
FIG. 6 is a block diagram of a computer system, according to one embodiment of the present disclosure.

FIG. 6 is a block diagram of a multiprocessor system 600 in accordance with an implementation. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores, although potentially many more cores may be present in the processors. A processor core may also be referred to as an execution core. The processors may each may include a PLD programmer 631, 632 and/or a PLD 634, 635, which may correspond to PLD programmer 135 and PLD 145 of FIG. 1 in some embodiments.

While shown with two processors 670, 680, it is to be understood that the scope of the present disclosure is not so limited. In other implementations, one or more additional processors may be present in a given processor.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, and 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7A:
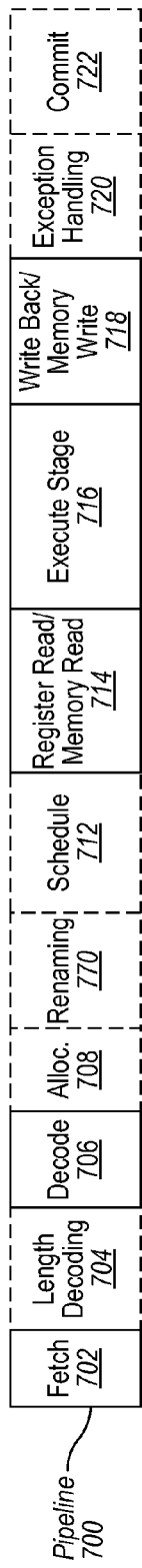
FIG. 7A is a block diagram illustrating an in-order pipeline and a register renaming stage, out-of-order issue/execution pipeline implemented by a processor core, in accordance with one embodiment of the present disclosure.
Figure 7B:
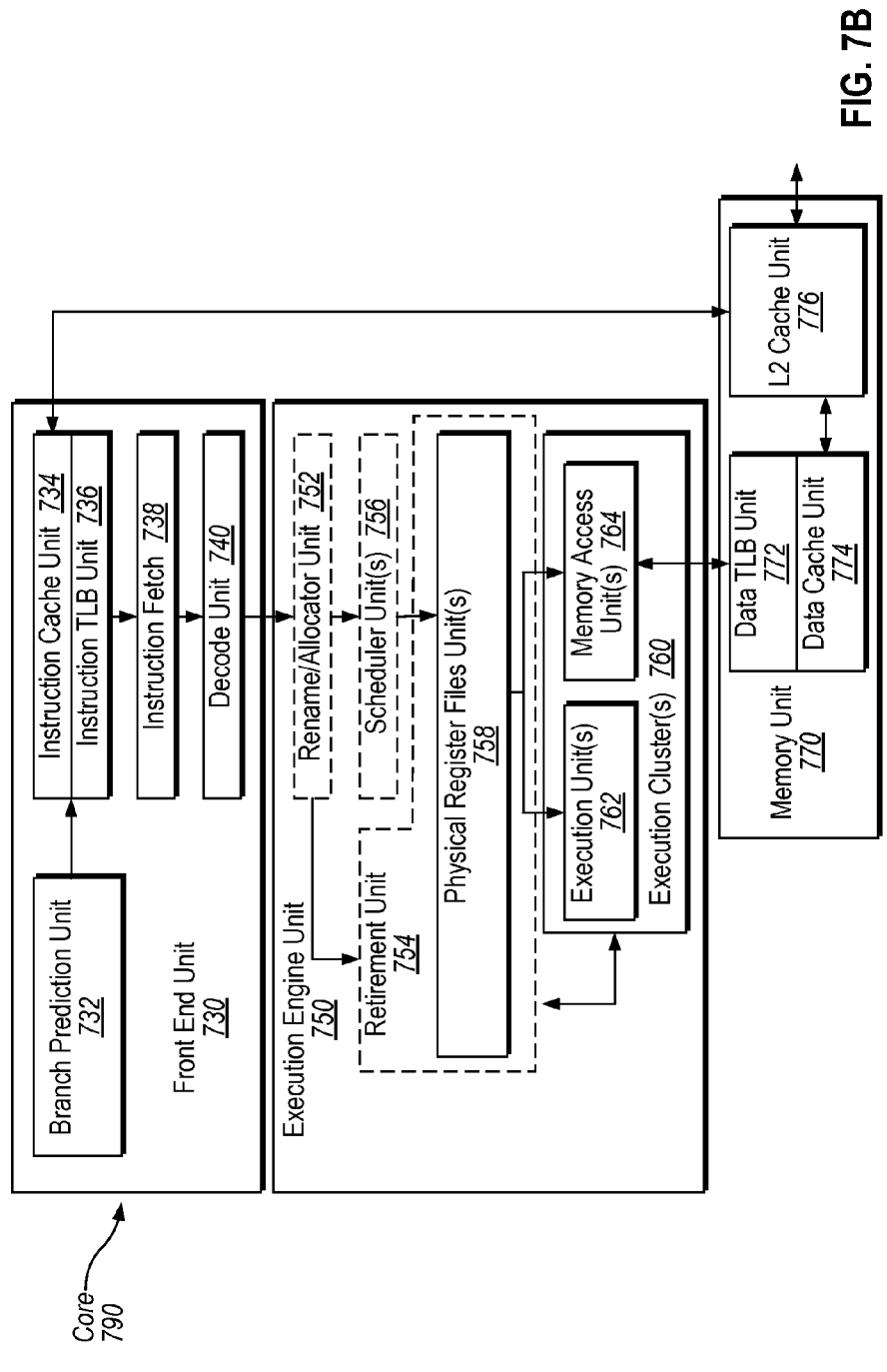
FIG. 7B is a block diagram illustrating an in-order architecture core and a register renaming logic, out-of-order issue/execution logic to be included in a processor according to at least one embodiment of the disclosure.

FIG. 7A is a block diagram illustrating an in-order pipeline and a register renaming stage, out-of-order issue/execution pipeline implemented by core 790 of FIG. 7B (which may be included in a processor). FIG. 7B is a block diagram illustrating an in-order architecture core and a register renaming logic, out-of-order issue/execution logic that may be included in a processor according to at least one embodiment of the invention. The solid lined boxes in FIG. 7A illustrate the in-order pipeline, while the dashed lined boxes illustrates the register renaming, out-of-order issue/execution pipeline. Similarly, the solid lined boxes in FIG. 7A illustrate the in-order architecture logic, while the dashed lined boxes illustrates the register renaming logic and out-of-order issue/execution logic. In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 710, an execute stage 716, a write back/memory write stage 718, an exception handling stage 722, and a commit stage 722. In one embodiment, a PLD configured to perform a secret operation (as discussed in conjunction with FIGS. 1-3) may be used by processing core 790 (illustrated in FIG. 7B) at one or more of stages of pipeline 700.

FIG. 7B is a block diagram illustrating an in-order architecture core and a register renaming logic, out-of-order issue/execution logic that may be included in a processor according to at least one embodiment of the disclosure. In FIG. 7B, arrows denote a coupling between two or more units and the direction of the arrow indicates a direction of data flow between those units. FIG. 7B shows processor core 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 710; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
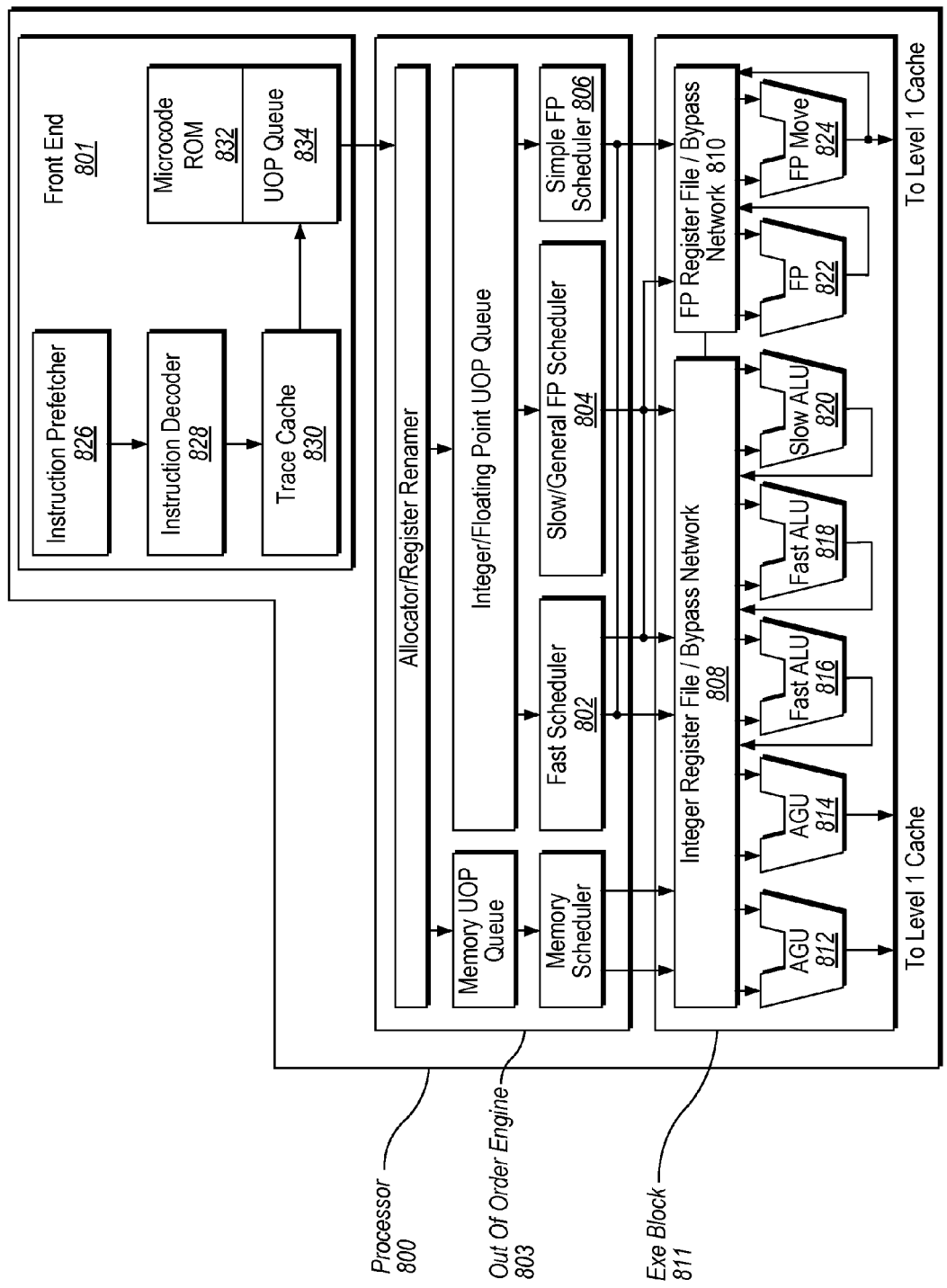
FIG. 8 is a block diagram of the micro-architecture for a processor that includes logic circuits to perform instructions, in accordance with one embodiment of the present invention.

FIG. 8 is a block diagram of the micro-architecture for a processor 800 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. The front end 801 may include several units. In one embodiment, the instruction prefetcher 826 fetches instructions from memory and feeds them to an instruction decoder 828 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one embodiment, if more than four micro-ops are needed to complete an instruction, the decoder 828 accesses the microcode ROM 832 to do the instruction. For one embodiment, an instruction can be decoded into a small number of micro ops for processing at the instruction decoder 828. In another embodiment, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, and 824 in the execution block 811. There is a separate register file 808, 810, for integer and floating point operations, respectively. Each register file 808, 810, of one embodiment also includes a bypass network that can bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 820, floating point ALU 822, floating point move unit 824. For one embodiment, the floating point execution blocks 822, 824, execute floating point, MMX, SIMD, and SSE, or other operations. The floating point ALU 822 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 816, 818. The fast ALUs 816, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
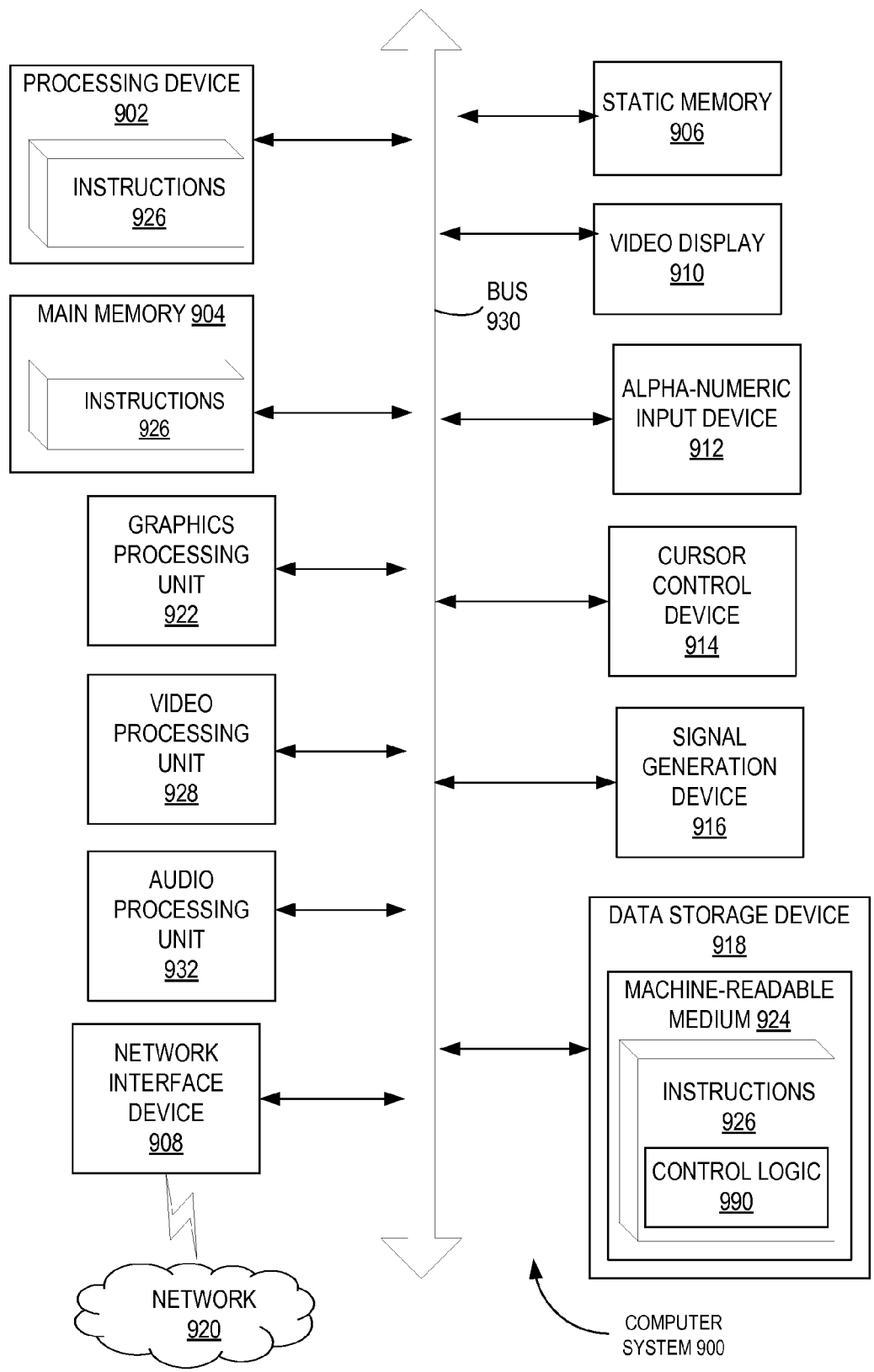
FIG. 9 illustrates a diagrammatic representation of a machine in the example form of a computer system within which a set of instructions, for causing the machine to perform any one or more of the methodologies discussed herein, may be executed.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, control logic (as discussed in conjunction with FIGS. 1-3) may be included in the execution block processing device 902. In another embodiment, the error recovery logic may be included in one or more other components of the computer system 900.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processing cores. In one embodiment, the processing device 902 is configured to execute the instructions 926 of a control logic 990 (or entire PLD programmer) for performing the operations discussed herein.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computer system 900 may include a graphics processing unit 922, a video processing unit 928, and an audio processing unit 932. In another embodiment, the computer system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored instructions 926 embodying any one or more of the methodologies of functions described herein. The instructions 926 may also reside, completely or at least partially, within the main memory 904 and/or within the processing device 902 during execution thereof by the computer system 900; the main memory 904 and the processing device 902 also constituting computer-readable storage media.

The computer-readable storage medium 924 may also be used to store instructions 926 utilizing, for example control logic 990, which may correspond to control logic described with respect to FIG. 1 or 2, and/or a software library containing methods that call the above applications. While the computer-readable storage medium 924 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an integrated circuit having a programmable logic device and a control circuit coupled to the programmable logic device (PLD). The control circuit is configured to detect that a reconfiguration criterion is satisfied. Responsive to the reconfiguration criterion being satisfied, the control circuit is further to configure, using one or more randomizations, the PLD to implement a secret operation, wherein a first randomized configuration of the PLD results in a first circuit implementation that is different from, but functionally equivalent to, a second circuit implementation that results from a second randomized configuration of the PLD.

Example 2 may optionally extend the subject matter of example 1. In example 2, the integrated circuit is one of a microprocessor or a system on a chip (SoC) and the programmable logic device comprises at least one of a programmable gate array (PGA) or a programmable logic array (PLA). Example 3 may optionally extend the subject matter of examples 1-2. In example 3, the programmable logic device has more degrees of freedom than are used to implement the secret operation.

Example 4 may optionally extend the subject matter of examples 1-3. In example 4, the integrated circuit further includes a memory coupled to the control circuit. The memory is configured to store configuration data having at least one randomization component, wherein the configuration data is used to generate at least one of the first randomized configuration or the second randomized configuration. Example 5 may optionally extend the subject matter of examples 1-4. In example 5, the integrated circuit further includes a memory coupled to the control circuit. The memory is configured to store a plurality of configuration files, wherein a first configuration file of the plurality of configuration files is used to generate the first randomized configuration and the second configuration file is used to generate the second randomized configuration, and wherein the control circuit is to select one of the plurality of configuration files to configure the PLD.

Example 6 may optionally extend the subject matter of examples 1-5. In example 6, the integrated circuit includes at least one of a hardware random number generator or a hardware pseudorandom number generator, coupled to the control circuit, to generate one or more random values, wherein the control circuit is to use the one or more random values to introduce the one or more randomizations for configuring the programmable logic device.

Example 7 may optionally extend the subject matter of examples 1-6. In example 7, the reconfiguration criterion comprises at least one of a first reconfiguration criterion that causes the PLD to be reconfigured each time the integrated circuit is activated, a second reconfiguration criterion that causes the PLD to be reconfigured each time the secret operation is to be performed, or a third reconfiguration criterion that causes the PLD to be reconfigured on a periodic basis. Example 8 may optionally extend the subject matter of examples 1-7. In example 8, the integrated circuit further includes a secret value securely stored by the integrated circuit, wherein the secret value is used as an input for the secret operation. Example 9 may optionally extend the subject matter of examples 1-8. In example 9, the integrated circuit further includes a plurality of programmable logic devices coupled to the control circuit, wherein responsive to the reconfiguration criterion being satisfied the control circuit is to select one of the plurality of programmable logic devices to configure to implement the secret operation.

Example 10 is an apparatus that includes a random number generator to generate a plurality of random values, a memory to store a configuration file for a secret operation, the configuration file having at least one randomization component, and a control circuit, coupled to the random number generator and the memory. The control circuit is configured to generate a first randomized configuration for a first programmable logic device (PLD) based on the configuration file, wherein the one or more first random values of the plurality of random values are used to introduce randomization into the at least one randomization component. The control circuit is further to use the first randomized configuration to configure the first PLD to implement the secret operation. The control logic is further to generate a second randomized configuration for a second PLD based on the configuration file, wherein one or more second random values of the plurality of random values are used to introduce randomization into the at least one randomization component. The control logic is further to use the second randomized configuration to configure the second PLD to implement the secret operation, wherein the second randomized configuration of the second PLD results in a second circuit implementation that is different from, but functionally equivalent to, a first circuit implementation that results from the first randomized configuration of the first PLD.

Example 11 may optionally extend the subject matter of example 10. In example 11, the random number generator comprises at least one of a hardware random number generator, a hardware pseudo-random number generator, a software random number generator or a software pseudo-random number generator. Example 12 may optionally extend the subject matter of examples 10-11. In example 12, the apparatus includes an integrated circuit receiving area to receive a first integrated circuit comprising the first PLD and to later receive a second integrated circuit comprising the second PLD.

Example 13 may optionally extend the subject matter of examples 10-21. In example 13, the memory comprises a plurality of different configuration files for the secret operation, wherein the control circuit is to select, based on one or more of the plurality of random values, an additional configuration file of the plurality of configuration files to use to configure a third PLD.

Example 14 is a method implemented by an integrated circuit. The method includes detecting, by a control circuit of the integrated circuit, that a reconfiguration criterion is satisfied. Responsive to detecting that the reconfiguration criterion is satisfied, the control circuit configures, using one or more randomizations, a programmable logic device (PLD) of the integrated circuit to implement a secret operation, wherein a first randomized configuration of the PLD results in a first circuit implementation. The control circuit detects that the reconfiguration criterion is again satisfied. Responsive to detecting that the reconfiguration criterion is again satisfied, the control circuit reconfigures, using the one or more randomizations, the PLD to implement the secret operation, wherein a second randomized configuration of the PLD results in a second circuit implementation that is different from, but functionally equivalent to, the first circuit implementation.

Example 15 may optionally extend the subject matter of example 14. In example 15, the integrated circuit is one of a microprocessor or a system on a chip (SoC), and the programmable logic device comprises at least one of a programmable gate array (PGA) or a programmable logic array (PLA). Example 16 may optionally extend the subject matter of examples 14-15. In example 16, the configuration data has at least one randomization component is used to generate at least one of the first randomized configuration or the second randomized configuration. Example 17 may optionally extend the subject matter of examples 14-16. In example 17, the method further includes randomly selecting a configuration file from a plurality of configuration files that will configure the PLD to implement the secret operation.

Example 18 may optionally extend the subject matter of examples 14-17. In example 18, the method further includes receiving one or more first random values, using the one or more first random values to introduce the one or more randomizations into the first randomized configuration, receiving one or more second random values, and using the one or more second random values to introduce the one or more randomizations into the second randomized configuration. Example 19 may optionally extend the subject matter of examples 14-18. In example 19, the reconfiguration criterion comprises at least one of a first reconfiguration criterion that causes the PLD to be reconfigured each time the integrated circuit is activated, a second reconfiguration criterion that causes the PLD to be reconfigured each time the secret operation is to be performed, or a third reconfiguration criterion that causes the PLD to be reconfigured on a periodic basis. Example 20 may optionally extend the subject matter of examples 14-19. In example 20, the integrated circuit comprises a plurality of programmable logic devices, and the method further includes selecting one of the plurality of programmable logic devices to configure to implement the secret operation.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "detecting," "determining," "using," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An integrated circuit comprising:
   a programmable logic device (PLD) having a plurality of gates or logics; and a control circuit coupled to the PLD, wherein the control circuit is to:
  detect that a reconfiguration criterion is satisfied; and
  responsive to the reconfiguration criterion being satisfied, configure, using one or more randomizations, the PLD to implement a secret operation, wherein a first randomized configuration of the PLD uses a first subset of the plurality of gates or logics and results in a first circuit implementation that is different from, but functionally equivalent to, a second circuit implementation that uses a second subset of the plurality of gates or logics and results from a second randomized configuration of the PLD.

2. The integrated circuit of claim 1, wherein:
  the integrated circuit is one of a microprocessor or a system on a chip (SoC); and
  the programmable logic device comprises at least one of a programmable gate array (PGA) or a programmable logic array (PLA).

3. The integrated circuit of claim 1, wherein the programmable logic device has more degrees of freedom than are used to implement the secret operation.

4. The integrated circuit of claim 1, further comprising:
  a memory, coupled to the control circuit, to store configuration data having at least one randomization component, wherein the configuration data is used to generate at least one of the first randomized configuration or the second randomized configuration.

5. The integrated circuit of claim 1, further comprising:
  a memory, coupled to the control circuit, to store a plurality of configuration files, wherein a first configuration file of the plurality of configuration files is used to generate the first randomized configuration and the second configuration file is used to generate the second randomized configuration, and wherein the control circuit is to select one of the plurality of configuration files to configure the PLD.

6. The integrated circuit of claim 1, further comprising:
  at least one of a hardware random number generator or a hardware pseudorandom number generator, coupled to the control circuit, to generate one or more random values, wherein the control circuit is to use the one or more random values to introduce the one or more randomizations for configuring the programmable logic device.

7. The integrated circuit of claim 1, wherein the reconfiguration criterion comprises at least one of a first reconfiguration criterion that causes the PLD to be reconfigured each time the integrated circuit is activated, a second reconfiguration criterion that causes the PLD to be reconfigured each time the secret operation is to be performed, or a third reconfiguration criterion that causes the PLD to be reconfigured on a periodic basis.

8. The integrated circuit of claim 1, further comprising:
  a secret value securely stored by the integrated circuit, wherein the secret value is used as an input for the secret operation.

9. The integrated circuit of claim 1, further comprising:
  a plurality of programmable logic devices coupled to the control circuit, wherein responsive to the reconfiguration criterion being satisfied the control circuit is to select one of the plurality of programmable logic devices to configure to implement the secret operation.

10. An apparatus comprising:
  a random number generator to generate a plurality of random values;
  a memory to store a configuration file for a secret operation, the configuration file having at least one randomization component; and
  a control circuit, coupled to the random number generator and the memory, wherein the control circuit is to:
    generate a first randomized configuration for a first instance of a programmable logic device (PLD) based on the configuration file, wherein the one or more first random values of the plurality of random values are used to introduce randomization into the at least one randomization component;
    use the first randomized configuration to configure the first instance of the PLD to implement the secret operation, wherein the PLD has a plurality of gates or logics;
    generate a second randomized configuration for a second instance of the PLD based on the configuration file, wherein one or more second random values of the plurality of random values are used to introduce randomization into the at least one randomization component; and
    use the second randomized configuration to configure the second instance of the PLD to implement the secret operation, wherein the second randomized configuration of the second instance of the PLD results in a second circuit implementation that is different from, but functionally equivalent to, a first circuit implementation that results from the first randomized configuration of the first instance of the PLD, wherein the first circuit implementation uses a first subset of the plurality of gates or logics and the second circuit implementation uses a second subset of the plurality of gates or logics.

11. The apparatus of claim 10, wherein the random number generator comprises at least one of a hardware random number generator, a hardware pseudo-random number generator, a software random number generator or a software pseudo-random number generator.

12. The apparatus of claim 10, further comprising:
  an integrated circuit receiving area to receive a first integrated circuit comprising the first instance of the PLD and to later receive a second integrated circuit comprising the second instance of the PLD.

13. The apparatus of claim 10, wherein the memory comprises a plurality of different configuration files for the secret operation, wherein the control circuit is to select, based on one or more of the plurality of random values, an additional configuration file of the plurality of configuration files to use to configure a third instance of the PLD.

14. A method comprising:
  detecting, by a control circuit of an integrated circuit, that a reconfiguration criterion is satisfied;
  responsive to detecting that the reconfiguration criterion is satisfied, configuring, using one or more randomizations, a programmable logic device (PLD) of the integrated circuit to implement a secret operation, wherein a first randomized configuration of the PLD results in a first circuit implementation that uses a first subset of a plurality of gates or logics of the PLD;
  detecting, by the control circuit, that the reconfiguration criterion is again satisfied; and
  responsive to detecting that the reconfiguration criterion is again satisfied, reconfiguring, using the one or more randomizations, the PLD to implement the secret operation, wherein a second randomized configuration of the PLD results in a second circuit implementation that is different from, but functionally equivalent to, the first circuit implementation, wherein the second circuit implementation uses a second subset of the plurality of gates or logics of the PLD.

15. The method of claim 14, wherein:

the integrated circuit is one of a microprocessor or a system on a chip (SoC); and the programmable logic device comprises at least one of a programmable gate array (PGA) or a programmable logic array (PLA).

16. The method of claim 14, wherein configuration data having at least one randomization component is used to generate at least one of the first randomized configuration or the second randomized configuration.

17. The method of claim 14, further comprising:

randomly selecting a configuration file from a plurality of configuration files that will configure the PLD to implement the secret operation.

18. The method of claim 14, further comprising:

receiving one or more first random values;

using the one or more first random values to introduce the one or more randomizations into the first randomized configuration;

receiving one or more second random values; and using the one or more second random values to introduce the one or more randomizations into the second randomized configuration.

19. The method of claim 14, wherein the reconfiguration criterion comprises at least one of a first reconfiguration criterion that causes the PLD to be reconfigured each time the integrated circuit is activated, a second reconfiguration criterion that causes the PLD to be reconfigured each time the secret operation is to be performed, or a third reconfiguration criterion that causes the PLD to be reconfigured on a periodic basis.

20. The method of claim 14, wherein the integrated circuit comprises a plurality of programmable logic devices, the method further comprising:

selecting one of the plurality of programmable logic devices to configure to implement the secret operation.

* * * * *